United States Patent
Zheng

(10) Patent No.: US 9,900,304 B2
(45) Date of Patent: *Feb. 20, 2018

(54) METHOD, APPARATUS AND SYSTEM FOR IMPLEMENTING THIRD PARTY APPLICATION IN MICRO-BLOGGING SERVICE

(71) Applicant: Tencent Technology (Shenzhen) Company Limited, Shenzhen (CN)

(72) Inventor: Wei Zheng, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/630,520

(22) Filed: Jun. 22, 2017

(65) Prior Publication Data

US 2017/0289126 A1    Oct. 5, 2017

Related U.S. Application Data

(63) Continuation of application No. 14/769,967, filed as application No. PCT/CN2014/080765 on Jun. 25, 2014, now Pat. No. 9,736,138.

(30) Foreign Application Priority Data

Jun. 26, 2013 (CN) .......................... 2013 1 0259805

(51) Int. Cl.
   *H04L 29/06* (2006.01)
   *H04W 4/20* (2018.01)
   *H04L 29/08* (2006.01)

(52) U.S. Cl.
   CPC .......... *H04L 63/08* (2013.01); *H04L 67/1091* (2013.01); *H04L 67/26* (2013.01); *H04W 4/206* (2013.01)

(58) Field of Classification Search
   CPC ..... H04L 63/08; H04L 67/1091; H04L 67/26; G06F 17/3053
   See application file for complete search history.

(56) References Cited

U.S. PATENT DOCUMENTS

| 9,311,462 B1 | 4/2016 | Brown |
| 2007/0174193 A1 | 7/2007 | Quan |

(Continued)

FOREIGN PATENT DOCUMENTS

| CN | 102595211 A | 7/2012 |
| CN | 102821085 A | 12/2012 |

(Continued)

OTHER PUBLICATIONS

International Search Report in international application No. PCT/CN2014/080765, dated Sep. 30, 2014.

(Continued)

*Primary Examiner* — Hadi Armouche
*Assistant Examiner* — Hee Song
(74) *Attorney, Agent, or Firm* — Oppedahl Patent Law Firm LLC

(57) ABSTRACT

A method for implementing a third party application in a micro-blogging service is provided, in which upon reception of a first request for presenting a media message provided by a third party media source, a micro-blog server obtains login information of a user and configuration information corresponding to the third party media source, converts the login information to authorization information, generates a second request for presenting the media message provided by the third party media source, and transmits the second request to a third party application server; the third party application server extracts the media message corresponding to the second request from the third party media source through a micro-blog open platform, by using the authorization infor- (Continued)

mation of the user and the configuration information corresponding to the third party media source, and presents it for the user.

11 Claims, 5 Drawing Sheets

(56) References Cited

U.S. PATENT DOCUMENTS

| | | | |
|---|---|---|---|
| 2012/0072835 A1 | 3/2012 | Gross | |
| 2012/0109754 A1 | 5/2012 | Mei | |
| 2012/0291070 A1* | 11/2012 | Feng | H04N 21/234336 725/40 |
| 2013/0086670 A1 | 4/2013 | Vangpat et al. | |
| 2013/0159277 A1 | 6/2013 | Liu | |
| 2013/0263232 A1 | 10/2013 | Yang | |
| 2013/0304836 A1 | 11/2013 | Ku et al. | |
| 2013/0339405 A1 | 12/2013 | Maki | |
| 2014/0068465 A1* | 3/2014 | Zhang | H04L 12/588 715/753 |
| 2014/0096205 A1 | 4/2014 | Zhuang et al. | |
| 2014/0207823 A1* | 7/2014 | Perry | G06F 17/30867 707/785 |
| 2014/0298242 A1 | 10/2014 | Zhang et al. | |
| 2014/0365570 A1 | 12/2014 | Peters | |

FOREIGN PATENT DOCUMENTS

| | | |
|---|---|---|
| CN | 103067381 A | 4/2013 |
| CN | 103220344 A | 7/2013 |
| WO | 2012094945 A1 | 7/2012 |
| WO | 2012097728 A1 | 7/2012 |

OTHER PUBLICATIONS

Notification of the First Office Action of Chinese application No. 201310259805.3, dated Nov. 3, 2015.
English Translation of the Written Opinion of the International Search Authority in international application No. PCT/CN2014/080765, dated Sep. 30, 2014.
English translation of the Notification of the First Office Action of Chinese application No. 201310259805.3, dated Nov. 3, 2015.

* cited by examiner

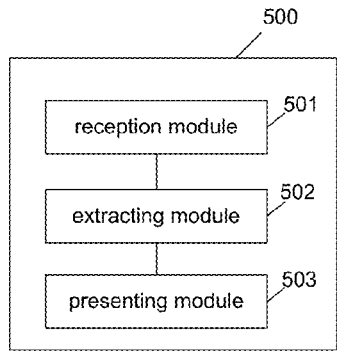
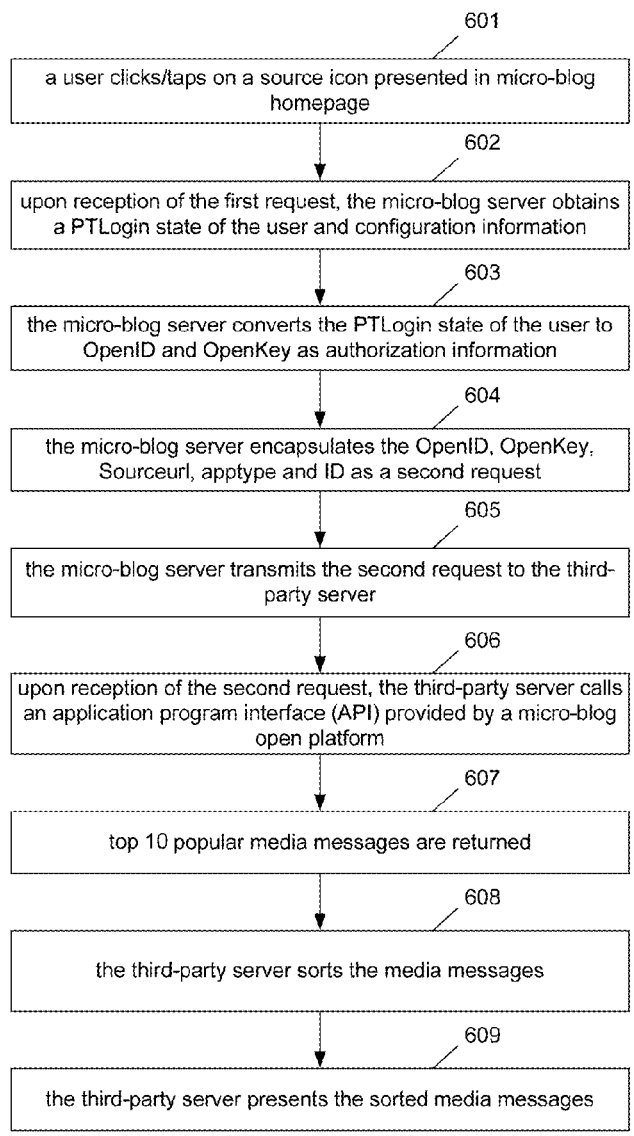

METHOD, APPARATUS AND SYSTEM FOR IMPLEMENTING THIRD PARTY APPLICATION IN MICRO-BLOGGING SERVICE

CROSS-REFERENCE TO RELATED APPLICATIONS

This is a continuation application of U.S. application Ser. No. 14/769,967, which is based on International Patent Application No. PCT/CN2014/080765, filed on Jun. 25, 2014, which claims priority of the Chinese patent application No. 201310259805.3, entitled "method, system and apparatus for presenting media information in micro-blog homepage" and filed by applicant Tencent Technology (Shenzhen) Co., Ltd on Jun. 26, 2013, which is incorporated into the present application by reference in its entity.

TECHNICAL FIELD

The disclosure generally relates to micro-blog pushing techniques, and in particular to a method, apparatus and system for implementing a third party application in a micro-blogging service.

BACKGROUND

Micro-blogging services allow a user to post messages (i.e., micro-blog posts) that are then viewable by other users that subscribe to messages from the user (i.e., are "followers" of the user). Various third party application providers push their own media messages, such as pictures and videos, to their followers by posting the media messages. Generally, besides the posted media messages, there are a huge amount of other media messages that can be provided by a third party application provider. A micro-blog user, after viewing a media message from a third party application provider in his/her micro-blog homepage, may wish to view other media messages from the third party application provider, which are not presented in the micro-blog homepage. Currently, there has never been an approach being proposed for the user to access the other media messages from the third party application provider in a quick and convenient manner.

SUMMARY

This disclosure in some aspects relates to a method, apparatus and system for implementing a third party application in a micro-blogging service, which allow a user to access media messages from third party media sources when viewing micro-blog posts, for example in his/her micro-blog homepage.

According to an aspect of the disclosure, a method for implementing a third party application in a micro-blogging service is provided, which includes steps as follows: at a micro-blog server, upon reception, from a client device, of a first request for presenting a media message provided by a third party media source, obtaining login information of a user of the client device and configuration information corresponding to the third party media source, wherein the first request contains an identification of the third party media source; converting the login information of the user to authorization information of the user; generating a second request for presenting the media message provided by the third party media source, the second request containing the authorization information of the user and the configuration information; and transmitting the second request for a third party application server associated with the third party media source.

According to another aspect of the disclosure, a non-transitory computer-readable storage medium is provided, which includes instructions that, when executed, cause the processor to perform the above method.

According to yet another aspect of the disclosure, a micro-blog server is provided, which includes a processor and a memory coupled to the processor and including instructions that, when executed, cause the processor to perform the above method.

According to yet another aspect of the disclosure, an apparatus for implementing a third party application in a micro-blogging service is provided, which includes: a reception module, configured to receive, from a client device, a first request for presenting a media message provided by a third party media source, wherein the first request contains an identification of the third party media source; an obtaining module, configured to obtain login information of a user of the client device and configuration information corresponding to the third party media source; a conversion module, configured to convert the login information of the user to authorization information of the user; a generation module, configured to generate a second request for presenting the media message provided by the third party media source, the second request containing the authorization information of the user and the configuration information; and a transmission module, configured to transmit the second request for a third party application server associated with the third party media source.

According to yet another aspect of the disclosure, a method for implementing a third party application in a micro-blogging service is provided, which includes steps as follows: at a third party application server, receiving, from a micro-blog server, a second request for presenting a media message provided by a third party media source associated with the third party application server, the second request containing authorization information of a user and configuration information corresponding to the third party media source; extracting, from the third party media source through a micro-blog open platform, the media message corresponding to the second request, by using the authorization information of the user and the configuration information corresponding to the third party media source; and presenting the media message for the user.

According to yet another aspect of the disclosure, a non-transitory computer-readable storage medium is provided, which includes instructions that, when executed, cause the processor to perform the above method.

According to yet another aspect of the disclosure, a third party application server is provided, which includes a processor and a memory coupled to the processor and including instructions that, when executed, cause the processor to perform the above method.

According to yet another aspect of the disclosure, an apparatus for implementing a third party application in a micro-blogging service is provided, which includes: a reception module, configured to receive, from a micro-blog server, a second request for presenting a media message provided by a third party media source, the second request containing authorization information of a user and configuration information corresponding to the third party media source; an extracting module, configured to extract the media message corresponding to the second request from the third party media source through a micro-blog open platform, by using the authorization information of the user and the configuration information with respect to the third party media source; and a presenting module, configured to present the media message for the user.

According to yet another aspect of the disclosure, a system is provided, which includes the above micro-blog server, the above third party application server, a third party media source configured to provide media messages, and one or more terminal devices, each configured to: display multiple media messages, each with a visual representation of a corresponding third party media source, in a graphical user interface (GUI); and upon detection of a user manipulation on the visual representation of the third party media source, transmit the first request for presenting the media message provided by the third party media source.

This section is intended to provide an overview of subject matter of the present patent application. It is not intended to provide an exclusive or exhaustive explanation of the invention. The completed description is included to provide further information about the present patent application.

BRIEF DESCRIPTION OF THE DRAWINGS

These and other sample aspects of the disclosure will be described in the completed description and the claims that follow, and in the accompanying drawings, wherein:

FIG. 5 is a simplified block diagram illustrating an apparatus for implementing a third party application in a micro-blogging service according to some embodiments of the disclosure;

FIG. 6 is a flow chart illustrating operations performed at the terminal device, the micro-blog server and the third party application server for implementing a third party application in a micro-blogging service according to some embodiments of the disclosure;

Figure 1:
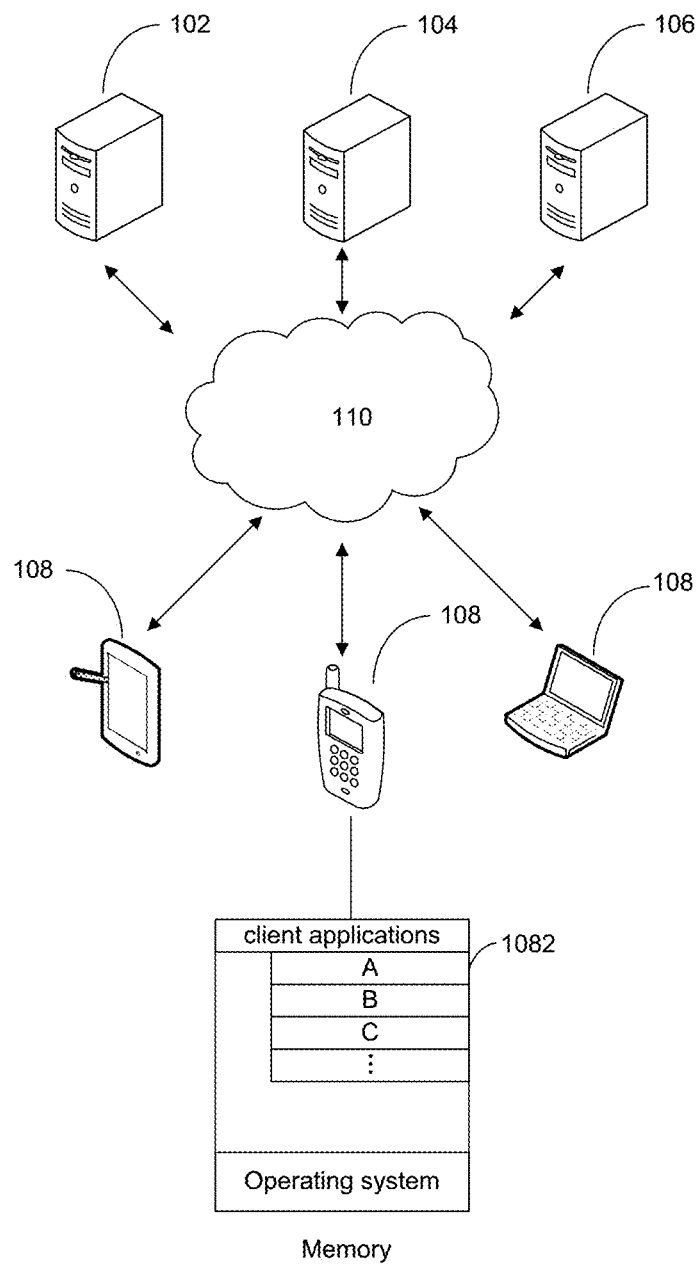
FIG. 1 is a schematic view illustrating a typical scenario in which a method according to some embodiments of the disclosure is implemented.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Reference throughout this specification to "an example," "an embodiment," or the like in the singular or plural means that one or more particular features, structures, or characteristics described in connection with an embodiment is included in at least one embodiment of the present disclosure. Thus, the appearances of the phrases "an example," "an embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

According to various embodiments of the disclosure, at least one third party application may be embedded into the micro-blogging service. When a micro-blog server receives from a client device a first request for presenting a media message provided by a third party media source, the micro-blog server obtains login information of a user of the client device and configuration information corresponding to the third party media source, converts the login information of the user to authorization information of the user, generates a second request for presenting the media message provided by the third party media source, and transmits the second request to a third party application server; when the third party application server receives the second request from the micro-blog server, the third party application server extracts the media message corresponding to the second request from the third party media source through a micro-blog open platform, by using the authorization information of the user and the configuration information corresponding to the third party media source; and presents the media message for the user.

FIG. 1 is a schematic view illustrating a typical scenario in which a method according to some embodiments of the disclosure is implemented.

In the embodiments, in order to implement a third party application in a micro-blogging service, for example, a user's micro-blog homepage, some steps are performed at a micro-blog server 102, some steps are performed at a third party application server 104, and other steps are performed at the terminal device 108. In a third party application, media messages presented to a user are extracted from a third party media source 106. As shown in FIG. 1, the micro-blog server 102, the third party application server 104, the third party media source 106 and the terminal device 108 communicate with each other through a network 110.

The third party application server 104 extracts media messages from the third party media source 106 through a micro-blog open platform. The micro-blog open platform is developed by the micro-blogging service provider and provides various application program interfaces (APIs) for various third party application providers' (including the third party application server's 104) use.

The terminal device 108 may be, for example, a desktop computer, a portable computer, a mobile phone, a tablet personal computer, a personal digital assistant, a self-service network terminal or other similar computing devices. A client application 1082 (for example, a general browser, or a specific client program) may be installed in the terminal device 108.

The network 110 may be, for example, Internet, mobile Internet (such as 2G and 3G network provided by telecommunication operators), and a local area network (wired or wireless).

Figure 2:
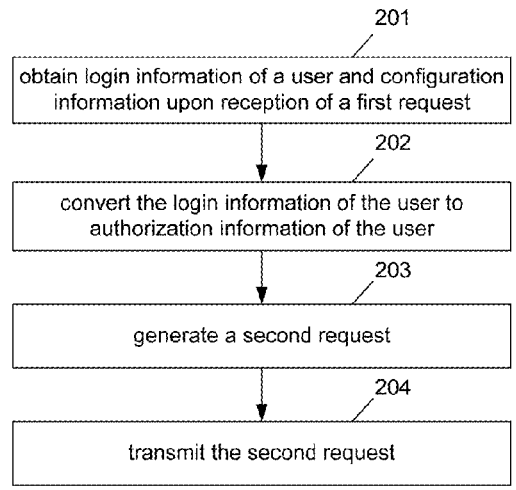
FIG. 2 is a flow chart illustrating a method for implementing a third party application in a micro-blogging service according to some embodiments of the disclosure.

FIG. 2 is a flow chart illustrating a method for implementing a third party application in a micro-blogging service according to some embodiments of the disclosure. Here, the method is performed at the micro-blog server 102. In an embodiment, as shown in FIG. 2, the method includes the following steps.

Step 201: when the micro-blog server receives, from a client device, a first request for presenting a media message provided by a third party media source, the micro-blog server obtains login information of a user of the client device and configuration information corresponding to the third party media source.

Here, the client device may refer to the client application 1082 installed in the terminal device 108, or the terminal device 108 itself. As known by one of ordinary skill in the art, for a user of the client application 1082, in order to access his/her micro-blog homepage, he/she generally needs to login to the micro-blog server. The user generally enters his/her login information, which may include account (UIN) (also referred to as username), Skey (also referred to as password) and the like, into a login interface in the client application, so as to login to the micro-blog server. The micro-blog server generates PTLogin information of the user in cookies based on the login information entered by the user. The PTLogin information may include account (UIN), Skey and the like. The cookies are managed by the micro-blog server.

In an embodiment, in a micro-blog homepage, a first media message from a third party media source (also referred to as a media message source or a third party media server, for example, http://xianguo.com/) other than the micro-blogging service provider (for example, http://t.qq-.com/) may be presented. Also, a user interface for accessing the third party media source is provided in the micro-blog homepage, for example, at the end of the media message. Specifically, for example, a link to the third party media source or a visual representation (e.g., a source icon) of the third party media source, may be presented at the end of the media message. When the user, after viewing the current media message, wishes to view other media messages from the very third party media source, he/she can initiate the first request for presenting the other media messages provided by the third party media source by simply clicking or tapping on the source icon.

Here, the configuration information mentioned above is pre-stored in the micro-blog server. In an embodiment, the micro-blog server may pre-store multiple pieces of configuration information, each corresponding to a respective third party media source and including a link address to the third party media source, an application type and an application number. Specifically, for each third party media source, a source icon, a link address to the third party media source, an application type and an application number may be pre-stored in the micro-blog server. For this, the third party media sources (such as Xianguo sharing, Sina news, Sina video, Baidu picture, Youku video and any other third party media service providers) must have registered on the micro-blog server beforehand. In order to obtain the configuration information corresponding to the third party media source, the micro-blog server searches the pre-stored multiple pieces of configuration information for the configuration information corresponding to the third party media source, by using the identification of the third party media source in the first request.

Step 202: the micro-blog server converts the login information of the user to authorization information of the user.

In an embodiment, the micro-blog server converts the login information of the user to the authorization information of the user according to an authorization standard specified by a micro-blog open platform, such that the login information of the user is not revealed to the third party application server.

The authorization standard specified by the micro-blog open platform may be, for example, an Oauth protocol, which is an existing authorization framework that enables a third-party application to obtain limited access to an HTTP service, such as Oauth1.0 or Oauth2.0. Detailed description of the Oauth protocol can be found from the website www.oauth.net and thus is omitted here.

Here, the authorization information includes an identity of the user and a key of the user. For example, when the authorization standard specified by the micro-blog open platform is Oauth1.0, the identity of the user refers to Openid, and the key of the user refers to Openkey.

Step 203: the micro-blog server generates a second request for presenting the media message provided by the third party media source.

Here, the second request contains the authorization information of the user and the configuration information corresponding to the third party media source.

In an embodiment, the micro-blog server encapsulates the authorization information of the user and the configuration information corresponding to the third party media source acquired in the previous steps in an Iframe format using JavaScript (which is a network script programming language, as known by person of ordinary skill in the art), in order to generate the second request. For example, the second request in the Iframe format may contain OpenID, OpenKey, Sourceurl, apptype and ID, where OpenID denotes the identity of the user, OpenKey denotes the key of the user, Sourceurl denotes the link to the third party media source, apptype denotes the application type, and ID denotes the application number.

Step 204: the micro-blog server transmits the second request to a third party application server associated with the third party media source.

Figure 3:
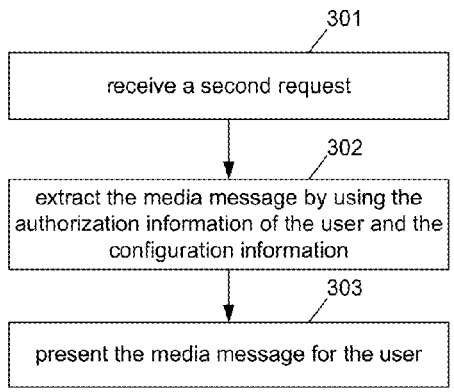
FIG. 3 is a flow chart illustrating a method for implementing a third party application in a micro-blogging service according to some embodiments of the disclosure.

FIG. 3 is a flow chart illustrating a method for implementing a third party application in a micro-blogging service according to some embodiments of the disclosure. Here, the method is performed at the third party application server 104. In an embodiment, as shown in FIG. 3, the method includes the following steps.

Step 301: the third party application server receives a second request for presenting a media message provided by a third party media source associated with the third party application server from a micro-blog server.

As described above, the second request contains authorization information of a user and configuration information corresponding to the third party media source, and the configuration information corresponding to the third party media source may contain a link address to the third party media source, an application type and an application number.

Step 302: the third party application server extracts the media message corresponding to the second request from the third party media source through a micro-blog open platform, by using the authorization information of the user and the configuration information corresponding to the third party media source.

Here, the micro-blog open platform provides open application program interfaces (APIs) for third party developers to develop their own third party applications based on the micro-blogging service. In an embodiment, the third party application server calls the API by using the authorization information of the user and the configuration information corresponding to the third party media source, to extract the media message corresponding to the second request from the third party media source through the API.

In an embodiment, one or more media messages may be extracted from the third party media source. The number of the media messages is preset by the micro-blog open platform based on at least one of the application type or the application number corresponding to the third party media source. For example, 20 pieces of news reposted for the most times are extracted from the Sina news, or 15 pieces of news updated latest are extracted from the Sina news, or top 10 media messages are extracted from the Sina video.

Step 303: the third party application server presents the media message for the user.

In an embodiment, the extracted preset number of media messages are sorted in a descending order of, for example, their respective numbers of repost times, rankings, or update times, and the sorted media messages are presented in a manner such that the preset number of media messages are located in a predetermined area of a graphical user interface (GUI) of a client device, for example, in a predetermined area of the micro-blog homepage.

Figure 4:
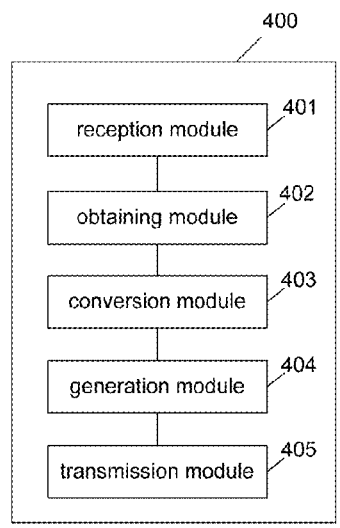
FIG. 4 is a simplified block diagram illustrating an apparatus for implementing a third party application in a micro-blogging service according to some embodiments of the disclosure.

FIG. 4 is a simplified block diagram illustrating an apparatus for implementing a third party application in a micro-blogging service according to some embodiments of the disclosure. Here, the apparatus 400 is implemented as the micro-blog server 102 as described above. As shown in FIG. 4, the apparatus 400 includes a reception module 401, an obtaining module 402, a conversion module 403, a generation module 404 and a transmission module 405.

The reception module 401 is configured to receive a first request for presenting a media message provided by a third party media source from a client device. Here, the first request contains an identification of the third party media source.

The obtaining module 402 is configured to obtain login information of a user of the client device and configuration information corresponding to the third party media source.

The conversion module 403 is configured to convert the login information of the user to authorization information of the user.

The generation module 404 is configured to generate a second request for presenting the media message provided by the third party media source. Here, the second request contains the authorization information of the user and the configuration information.

The transmission module 405 is configured to transmit the second request for a third party application server associated with the third party media source.

In an embodiment, the conversion module 403 is configured to convert the login information of the user to the authorization information of the user according to an authorization standard specified by a micro-blog open platform, such that the login information of the user is not revealed to the third party application server.

In an embodiment, optionally, the apparatus 400 may also include a pre-storage module 406, configured to pre-store multiple pieces of configuration information, each corresponding to a respective third party media source and comprising a link address to the third party media source, an application type and an application number.

In an embodiment, the obtaining module 402 is configured to search the pre-stored multiple pieces of configuration information for the configuration information corresponding to the third party media source by using the identification of the third party media source in the first request, in order to obtain the configuration information corresponding to the third party media source.

FIG. 5 is a simplified block diagram illustrating an apparatus for implementing a third party application in a micro-blogging service according to some embodiments of the disclosure. Here, the apparatus 500 is implemented as the third party application server 104 as described above. As shown in FIG. 5, the apparatus 500 includes a reception module 501, an extracting module 502, and a presenting module 503.

The reception module 501 is configured to receive a second request for presenting a media message provided by a third party media source from a micro-blog server. Here, the second request contains authorization information of a user and configuration information corresponding to the third party media source.

The extracting module 502 is configured to extract the media message corresponding to the second request from the third party media source through a micro-blog open platform, by using the authorization information of the user and the configuration information with respect to the third party media source.

The presenting module 503 is configured to present the media message for the user.

In an embodiment, the extracting module 502 is configured to call, by using the authorization information of the user and the configuration information corresponding to the third party media source, an application program interface (API) provided by the micro-blog open platform, to extract through the API the media message corresponding to the second request from the third party media source.

In an embodiment, the configuration information corresponding to the third party media source contains a link address to the third party media source, an application type and an application number.

In an embodiment, the media message includes a preset number of media messages, and the number of the media messages is preset by the micro-blog open platform based on at least one of the application type or the application number corresponding to the third party media source.

In an embodiment, the presenting module 503 is configured to present the preset number of media messages in a manner such that the preset number of media messages are located in a predetermined area of a graphical user interface (GUI) of a client device.

FIG. 6 is a flow chart illustrating operations performed at the terminal device, the micro-blog server and the third party application server for implementing a third party application in a micro-blogging service according to some embodiments of the disclosure. Here, the media message is presented in a micro-blog homepage.

Step 601: a user clicks/taps on a source icon presented in his/her micro-blog homepage, in which micro-blog posts are sorted in a timeline.

Figure 7:
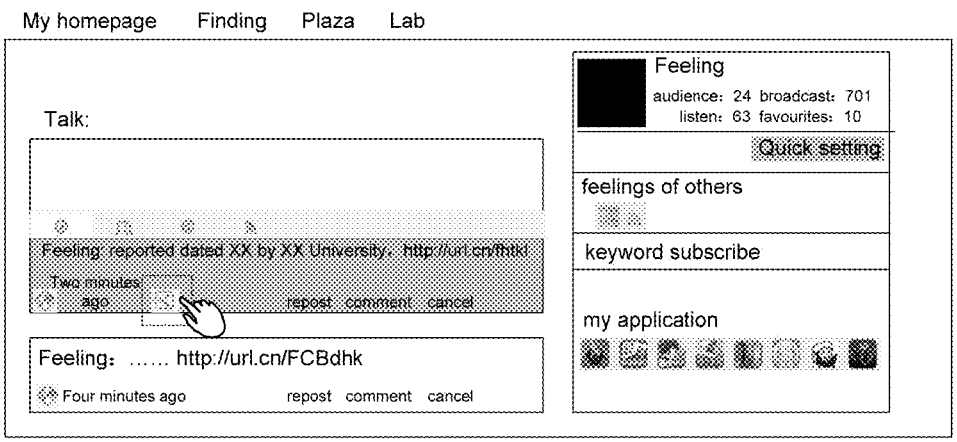
FIG. 7 is a schematic view of a micro-blog homepage according to some embodiments of the disclosure.

Here, the user is using a client application to access his/her micro-blog homepage, and the source icon represents a source of a corresponding micro-blog post. For example, as shown in FIG. 7, the user taps on the source icon "Xianguo net", which is presented subsequent to the update time of the corresponding micro-blog post. The user's manipulation on the source icon triggers transmission of a first request to the micro-blog server, for presenting media messages (for example, videos) provided by a third party media source corresponding to the source icon.

Step 602: upon reception of the first request, the micro-blog server obtains a PTLogin state of the user, including UIN and Skey, from cookies, and obtains configuration information, including Sourceurl, apptype and ID of the third party media source, from a pre-stored correspondence table.

Step 603: the micro-blog server converts the PTLogin state of the user to OpenID and OpenKey as authorization information.

Step 604: the micro-blog server encapsulates the OpenID, OpenKey, Sourceurl, apptype and ID as a second request for presenting media messages provided by the third party media source.

Step 605: the micro-blog server transmits the second request to the third-party server.

Step 606: upon reception of the second request, the third-party server takes the OpenID, OpenKey, Sourceurl, apptype and ID in the second request as input parameters to call an application program interface (API) provided by a micro-blog open platform.

Step 607: as a result of calling the API, top 10 popular media messages are returned from the media message server to the third party application server, through the called API.

Step 608: the third-party server sorts the media messages.

Figure 8:
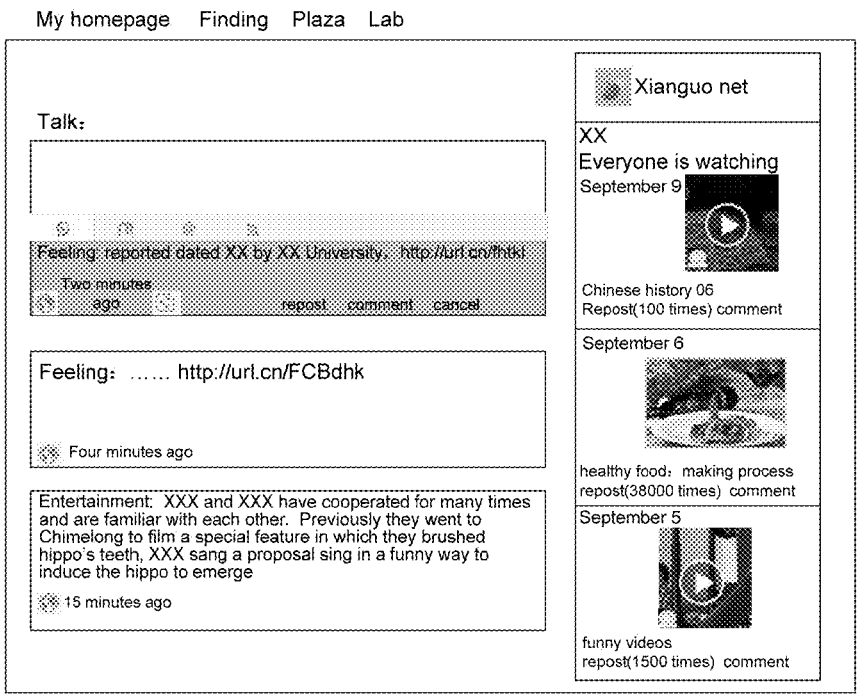
FIG. 8 is a schematic view of a micro-blog homepage according to some embodiments of the disclosure.
Figure 9:
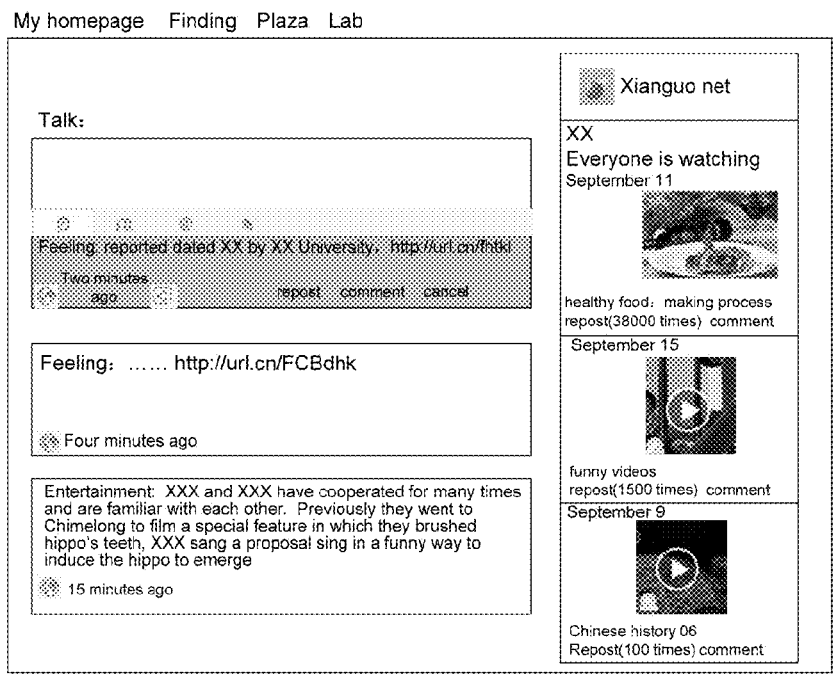
FIG. 9 is a schematic view of a micro-blog homepage according to some embodiments of the disclosure.

In an embodiment, the media messages may be sorted in an order of timeline. As shown in FIG. 8, the videos are sorted in a descending order of their respective update times. In another embodiment, the media messages may be sorted in an order of numbers of repost times. As shown in FIG. 9, the videos are sorted in a descending order of their respective numbers of repost times.

Step 609: the third-party server presents the sorted media messages in the micro-blog homepage.

In an embodiment, the sorted media message may be presented in a predetermined area of the micro-blog homepage. As shown in FIGS. 8 and 9, the sorted videos are presented in the right side of the micro-blog homepage.

Although FIGS. 2, 3 and 6 illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives.

Moreover, the ordinary skilled in the art may understand that all or part of the flow in the method of the embodiments may be implemented through associated hardware controlled by computer programs, which may be stored in a non-transitory computer readable storage medium and may when executed include the flow mentioned in the embodiments of the above methods. In an example, the computer readable storage medium may implement at least some portions of the memory. For example, the computer readable storage medium may include both ROM and RAM. The computer readable storage medium may be implemented as a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or any other suitable computer-readable storage medium.

Figure 10:
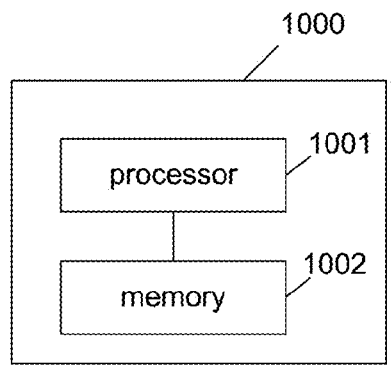
FIG. 10 is a block diagram illustrating the micro-blog server according to some embodiments of the disclosure.

FIG. 10 is a block diagram illustrating the micro-blog server 102 according to some embodiments of the disclosure. In an embodiment, software running on the micro-blog server 102 performs one or more steps of the method as described referring to FIGS. 2 and 6 or implements functions of the various modules as described referring to FIG. 4.

In an embodiment, the micro-blog server 102 includes a processor 1001 and a memory 1002.

In an example, the processor 1001 includes hardware for executing instructions, for example, one or more computer programs. The processor 1001 may retrieve instructions from the memory 1002 and execute them. The processor 1001 may be implemented as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more of the method steps as described referring to FIGS. 2 and 6 or to implement the various modules as described referring to FIG. 4.

In an example, the memory 1002 may store instructions for the processor 1001 to execute or data for the processor 1002 to operate on. In an example, the memory 1002 may include random access memory (RAM), which may be dynamic RAM (DRAM) or static RAM (SRAM) as desired. Additionally, the memory 1002 may include storage for storing data and instructions, such as read-only memory (ROM), such as mask-programmed ROM, programmable ROM (PROM), erasable PROM (EPROM), electrically erasable PROM (EEPROM), electrically alterable ROM (EAROM), or flash memory. In an example, the storage may be internal or external to the micro-blog server 102. In an example, the storage stores instructions for performing one or more of the method steps as described referring to FIGS. 2 and 6 or for implementing the various modules as described referring to FIG. 4. As an example and not by way of limitation, the micro-blog server 102 may load instructions from the storage or other sources (for example, remote sources) to the RAM, and then the processor 1001 may retrieve the instructions from the RAM to execute them. In an example, the memory 1002 may include one or more memories.

Figure 11:
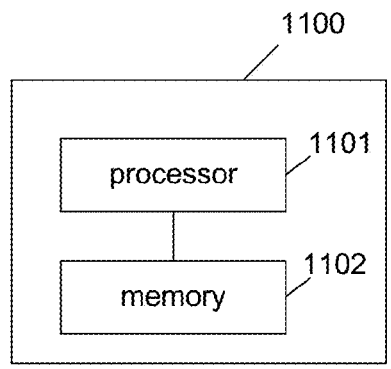
FIG. 11 is a block diagram illustrating the third party application server according to some embodiments of the disclosure.

FIG. 11 is a block diagram illustrating the third party application server according to some embodiments of the disclosure. In an embodiment, software running on the third party application server 104 performs one or more steps of the method as described referring to FIGS. 3 and 6 or implements functions of the various modules as described referring to FIG. 5.

In an embodiment, the third party application server 104 includes a processor 1101 and a memory 1102. The physical characteristics of the processor 1101 and the memory 1102 are similar to the processor 1001 and the memory 1002 as described above, respectively and thus detailed description thereof is omitted here.

Herein, one or more non-transitory computer readable storage media may be contemplated for implementing any suitable storage. In an example, a non-transitory computer readable storage medium may implement at least some portions of the memory 1002 or 1102. The non-transitory computer readable storage medium may be implemented as a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a SECURE DIGITAL card, a SECURE DIGITAL drive, or any other suitable computer-readable storage medium. The non-transitory computer readable storage medium may carry instructions, which when executed, causes at least one of the data traffic prompting methods provided in the disclosure to be performed.

While the foregoing disclosure discusses illustrative aspects and/or embodiments, it should be noted that various changes and modifications could be made herein without departing from the scope of the described aspects and/or embodiments as defined by the appended claims.

The invention claimed is:

1. A method for implementing a third party application in a micro-blogging service, comprising:
   at a third party application server,
   providing configuration information corresponding to a third party media source to micro-blog server;
   receiving, from the micro-blog server, a second request for presenting a media message provided by the third party media source associated with the third party application server, the second request containing authorization information of a user that has already logined to the micro-blog server and configuration information corresponding to the third party media source, wherein the authorization information originates from login information of the user which is obtained from the micro-blog server per se, but does not reveal the login information of the user;
   extracting, from the third party media source through a micro-blog open platform, the media message corresponding to the second request, by using the authorization information of the user and the configuration information corresponding to the third party media source; and
   presenting the media message for the user,
   wherein the configuration information corresponding to the third party media source contains a link address to the third party media source, an application type and an application number, and
   wherein the media message comprises a preset number of media messages, and the number of the media messages is preset by the micro-bloq open platform based on at least one of the application type or the application number corresponding to the third party media source.

2. The method according to claim 1, wherein the extracting comprises:
   calling, by using the authorization information of the user and the configuration information corresponding to the third party media source, an application program interface (API) provided by the micro-blog open platform, to extract through the API the media message from the third party media source.

3. The method according to 1, wherein the presenting comprises:
   presenting the media message in a manner such that the media message is located in a predetermined area of a graphical user interface (GUI) of a client device.

4. The method according to claim 1, further comprising:
   at the micro-blog server,
   upon reception, from a client device, of which the user has already logined to the micro-blog server, of a first request for presenting a media message provided by the third party media source, obtaining the login information of the user of the client device and the configuration information corresponding to the third party media source, the first request containing an identification of the third party media source;
   converting the login information of the user to the authorization information of the user which does not reveal the login information of the user;
   generating the second request for presenting the media message provided by the third party media source, the second request containing the authorization information of the user and the configuration information; and
   transmitting the second request to the third party application server associated with
   the third party media source,
   wherein the method further comprises:
   at the micro-blog server,
   pre-storing multiple pieces of configuration information, each corresponding to a respective third party media source and comprising a link address to the third party media source, an application type and an application number.

5. The method according to claim 4, wherein the obtaining the configuration information corresponding to the third party media source comprises:
   searching the pre-stored multiple pieces of configuration information for the configuration information corresponding to the third party media source, by using the identification of the third party media source in the first request.

6. A third party application server, comprising:
   a processor; and
   a memory, coupled to the processor, and including instructions that when executed, cause the processor to
   provide configuration information corresponding to a third party media source to micro-blog server
   receive, from the micro-blog server, a second request for presenting a media message provided by the third party media source associated with the third party application server, the second request containing authorization information of a user that has already logined to the micro-blog server and configuration information corresponding to the third party media source, wherein the authorization information originates from login information of the user which is obtained from the micro-blog server per se, but does not reveal the login information;

extract, from the third party media source through a micro-blog open platform, the media message corresponding to the second request, by using the authorization information of the user and the configuration information corresponding to the third party media source; and present the media message for the user, wherein the configuration information corresponding to the third party media source contains a link address to the third party media source, an application type and an application number, and wherein the media message comprises a preset number of media messages, and the number of the media messages is preset by the micro-blog open platform based on at least one of the application type or the application number corresponding to the third party media source.

7. The third party application server according to claim 6, wherein the third party application server is configured to call, by using the authorization information of the user and the configuration information corresponding to the third party media source, an application program interface (API) provided by the micro-blog open platform, to extract through the API the media message from the third party media source.

8. The third party application server according to claim 6, wherein the third party application server is configured to present the media message in a manner such that the media message is located in a predetermined area of a graphical user interface (GUI) of a client device.

9. A non-transitory computer-readable storage medium including instructions that, when executed, cause a processor to perform a method for implementing a third party application in a micro-blogging service, the method comprising:

at a third party application server,
providing configuration information corresponding to a third party media source to micro-blog server;

receiving, from the micro-blog server, a second request for presenting a media message provided by the third party media source associated with the third party application server, the second request containing authorization information of a user that has already logined to the micro-blog server and configuration information corresponding to the third party media source, wherein the authorization information originates from login information of the user which is obtained from the micro-blog server per se, but does not reveal the login information of the user;

extracting, from the third party media source through a micro-blog open platform, the media message corresponding to the second request, by using the authorization information of the user and the configuration information corresponding to the third party media source; and presenting the media message for the user, wherein the configuration information corresponding to the third party media source contains a link address to the third party media source, an application type and an application number, and wherein the media message comprises a preset number of media messages, and the number of the media messages is preset by the micro-blog open platform based on at least one of the application type or the application number corresponding to the third party media source.

10. The non-transitory computer-readable storage medium according to claim 9, wherein the extracting comprises:

calling, by using the authorization information of the user and the configuration information corresponding to the third party media source, an application program interface (API) provided by the micro-blog open platform, to extract through the API the media message from the third party media source.

11. The non-transitory computer-readable storage medium according to 9, wherein the presenting comprises:

presenting the media message in a manner such that the media message is located in a predetermined area of a graphical user interface (GUI) of a client device.

* * * * *